US007543278B2

(12) United States Patent
Klementiev

(10) Patent No.: US 7,543,278 B2
(45) Date of Patent: Jun. 2, 2009

(54) SYSTEM AND METHOD FOR MAKING A USER INTERFACE ELEMENT VISIBLE

(75) Inventor: Dmitri A. Klementiev, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 779 days.

(21) Appl. No.: 10/966,855

(22) Filed: Oct. 15, 2004

(65) Prior Publication Data

US 2006/0085764 A1     Apr. 20, 2006

(51) Int. Cl.
*G06F 9/44* (2006.01)
*G06F 3/048* (2006.01)
*G06F 17/30* (2006.01)

(52) U.S. Cl. ............................ 717/125; 715/786; 707/4

(58) Field of Classification Search ........................ None
See application file for complete search history.

(56) References Cited

U.S. PATENT DOCUMENTS

| | | | | |
|---|---|---|---|---|
| 5,488,685 A * | 1/1996 | Palmer et al. | ................ | 715/708 |
| 5,588,107 A * | 12/1996 | Bowden et al. | ............. | 715/828 |
| 5,781,720 A * | 7/1998 | Parker et al. | .................. | 714/38 |
| 5,784,059 A * | 7/1998 | Morimoto et al. | ........... | 715/854 |
| 6,018,524 A * | 1/2000 | Turner et al. | ................ | 370/392 |
| 6,100,889 A * | 8/2000 | Sciammarella et al. | ...... | 715/815 |
| 6,160,552 A * | 12/2000 | Wilsher et al. | .............. | 715/739 |
| 6,188,406 B1 * | 2/2001 | Fong et al. | ................... | 715/810 |
| 6,380,947 B1 * | 4/2002 | Stead | ......................... | 345/645 |
| 6,430,574 B1 * | 8/2002 | Stead | ...................... | 707/104.1 |
| 6,448,985 B1 * | 9/2002 | McNally | ..................... | 715/784 |
| 7,093,238 B2 * | 8/2006 | Givoni et al. | ............... | 717/129 |
| 7,242,413 B2 * | 7/2007 | Chu et al. | .................... | 345/619 |
| 7,266,785 B2 * | 9/2007 | Grotjohn | ..................... | 715/853 |

(Continued)

OTHER PUBLICATIONS

Samin Beydeda and Volker Gruhn, BINTEST—Binary Search-based Test Case Generation [online], 2003 [retrieved on Mar. 13, 2009], pp. 1-6. Retrieved from the Internet: <URL: http://portal.acm.org/citation.cfm?id=950795>.*

(Continued)

*Primary Examiner*—Tuan Q Dam
*Assistant Examiner*—Hanh T Bui
(74) *Attorney, Agent, or Firm*—Klarquist Sparkman, LLP

(57) ABSTRACT

Various new and non-obvious apparatus and methods for ensuring a user interface element is visible within an automated user interface test environment are disclosed. One of the disclosed embodiments is a method for locating a parent element of the user interface element and then making the user interface object visible using top-down scrolling, bottom-up scrolling, expanding, or a combination of all three. Top-down scrolling scrolls the parent element until the user interface element becomes visible. Bottom-up scrolling first locates a grandparent element. The parent element then scrolls until the user interface element is within the parent object. The grandparent element is then scrolled until the parent element is visible within the grandparent element, the parent object is then scrolled until the user interface element is visible within the grandparent element. This exemplary embodiment further confirms that the user element interface made visible can be selected by ensuring that the window where the user interface element resides is ready for user input and is not covered by another object.

14 Claims, 17 Drawing Sheets

U.S. PATENT DOCUMENTS

| | | | |
|---|---|---|---|
| 2001/0043238 A1* | 11/2001 | Guerrero | 345/853 |
| 2004/0133880 A1* | 7/2004 | Paternostro et al. | 717/124 |
| 2005/0251757 A1* | 11/2005 | Farn | 715/810 |
| 2006/0059435 A1* | 3/2006 | Molesky et al. | 715/786 |
| 2006/0059441 A1* | 3/2006 | Todd | 715/853 |

OTHER PUBLICATIONS

M. Prasanna et al., A Survey On Automatic Test Case Generation [online], 2005 [retrieved on Mar. 13, 2009], Academic Open Internet Journal, vol. 15. Retrieved from the Internet: <URL: http://www.acadjournal.com/2005/v15/part6/p4/>.*

* cited by examiner

SYSTEM AND METHOD FOR MAKING A USER INTERFACE ELEMENT VISIBLE

COPYRIGHT AUTHORIZATION

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

TECHNICAL FIELD

This invention relates generally to the testing of software applications, and more particularly to the ensuring the visibility of graphical user interface items that are to be tested.

BACKGROUND

We are dependent, in the modern world, on our computers and the applications that they run. We rely on our software, in just about every aspect of work and home lives, to run correctly. Software errors can cause serious problems in many settings, such as medical applications, banking applications, controls in airplanes and motor vehicles, and so forth.

Thus, it is quite important that computer application programs function properly. To ensure such reliability, the applications must be tested to ensure they have as few errors, or "bugs", as possible. In the initial days of application development, computer software companies would hire in-house testers to attempt to mimic end-user input and thus discover problems in the code, a method that is used to this day. Another common method of testing is to ship beta versions— software that is known to still contain errors—to customer sites; and the customers then, by using the software, continue to test it. However, both in-house and beta testing require either excessively long periods of time or huge numbers of user sites to find sufficiently large numbers of errors to produce adequately error-free computer applications. To solve these problems, automatic testing programs have been developed which mimic keyboard and mouse user input and which can be used to test applications much more quickly, as unlike humans they run continuously and at-speed. Thus, they can be used to more exhaustively test applications leading to higher quality software.

To test the control items of an application, a test program that emulates keyboard and mouse data must be able to select items on the screen. At a minimum, the item must be visible for it to be selected. The term "Select Item" herein means a user interaction with a UI element (item) via mouse, keyboard, or another input device.

SUMMARY

As described herein, a way to ensure that a user interface object is visible, and thus, able to be selected by an automated testing program, is provided. The various techniques and tools can be used in combination or independently. The disclosed exemplary apparatus and methods should not be construed as limiting in any way. Instead, the present disclosure is directed toward novel and non-obvious features and aspects of the various disclosed embodiments, alone and in various combinations and subcombinations with one another. The methods are not limited to any specific aspect, feature, or combinations thereof, nor do the disclosed methods require that any one or more specific advantages be present or problems be solved.

In one implementation, the hierarchy of the user interface element is traversed to the parent element of the user interface element that is to be made visible. Then, a make-child-visible action is performed. If the object is scrollable, the make-child-visible action scrolls the parent object to make the immediate child object visible. If the object is expandable, the make child visible action expands the object. Once the object has been made visible, it still may not be selectable (that is, able to be selected when it is clicked upon by a user or a user emulation test program) if the window the object resides in is disabled, does not have focus, or if there is another object covering the object. These conditions are checked for to ensure that the object is selectable.

In an embodiment, a top-down approach is used to make scrollable objects visible. The first element in the parent of the element that is visible within the parent's object view area is located, the location of the first visible element is compared to the location of the element to be made visible, and then the parent is scrolled in the appropriate direction. Sometimes, the element to be made visible fails to appear before the end of the scrolling object is reached. In this case, the scrolling direction is reversed. A binary search can be performed to locate the first visible element. In some embodiments, locations that have previously been searched are marked in a hash table to ensure they are only checked once.

In another embodiment, scrollable objects are made visible using a bottom-up approach. The hierarchy of the chosen user interface object is traversed from bottom to top. Starting at the parent of the bottom object, each parent object is scrolled to display the child object within the parent object. When the top object is reached, the hierarchy is again traversed to the bottom. Each parent object is then scrolled until the child object is displayed within the grandparent object.

In another embodiment, a user object hierarchy is traversed from bottom to top, with each object in turn being expanded or scrolled, depending upon its type.

Additional features and advantages will be made apparent from the following detailed description of various embodiments that proceeds with reference to the accompanying drawings.

DETAILED DESCRIPTION OF THE INVENTION

Computing Environment

Figure 1A:
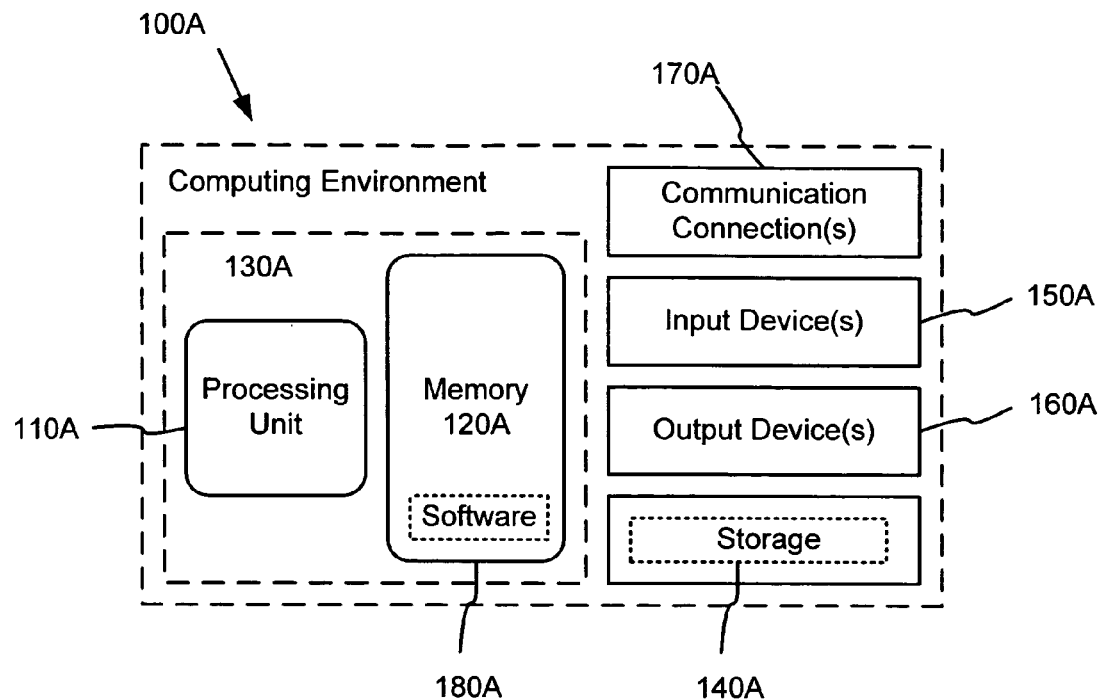
FIG. 1A is a block diagram of a computer system.

FIG. 1A illustrates a generalized example of a suitable computing environment 100A in which several of the described embodiments may be implemented. The computing environment 100A is not intended to suggest any limitation as to scope of use or functionality, as the techniques and tools may be implemented in diverse general-purpose or special-purpose computing environments.

With reference to FIG. 1A, the computing environment 100A includes at least one processing unit 110A and memory 120A. In FIG. 1, this most basic configuration 130A is included within a dashed line. The processing unit 110A executes computer-executable instructions and may be a real or a virtual processor. In a multi-processing system, multiple processing units execute computer-executable instructions to increase processing power. The memory 120A may be volatile memory (e.g., registers, cache, RAM), non-volatile memory (e.g., ROM, EEPROM, flash memory, etc.), or some combination of the two. The memory 120A stores software 180A implementing a method and apparatus to make a UI element visible.

A computing environment may have additional features. For example, the computing environment 100A includes storage 140A, one or more input devices 150A, one or more output devices 160A, and one or more communication connections 170A. An interconnection mechanism (not shown) such as a bus, controller, or network interconnects the components of the computing environment 100A. Typically, operating system software (not shown) provides an operating environment for other software executing in the computing environment 100A, and coordinates activities of the components of the computing environment 100A.

The storage 140A may be removable or non-removable, and includes magnetic disks, magnetic tapes or cassettes, CD-ROMs, DVDs, or any other medium which can be used to store information and which can be accessed within the computing environment 100A. The storage 140A stores instructions for the software 180A implementing the mechanisms to make a UI element visible.

The input device(s) 150A may be a touch input device, such as a keyboard, mouse, pen, or trackball, a voice input device, a scanning device, or another device that provides input to the computing environment 100A. For audio or video encoding, the input device(s) 150A may be a sound card, video card, TV tuner card, or similar device that accepts audio or video input in analog or digital form, or a CD-ROM or CD-RW that reads audio or video samples into the computing environment 100A. The output device(s) 160A may be a display, printer, speaker, CD-writer, or another device that provides output from the computing environment 100A.

The communication connection(s) 170A enable communication over a communication medium to another computing entity. The communication medium conveys information, such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 100A, computer-readable media include memory 120A, storage 140A, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

If desired, the technologies described herein (i.e. ensuring that user interface items are visible, and so can be selected for automated testing) can be provided as part of an automated testing service. Programs interacting with the service can thus take advantage of the features as desired.

The various technologies described herein are useful to ensure that a user interface element is visible and selectable. User interface elements can take many forms, such as graphical pushbuttons, edit boxes, scroll bars, picklists, drop down menus, ACTIVEX controls, images and the like. User interface elements can appear as part of a program (e.g., to control functionality of the program) or within a document.

The present invention is generally directed to the automated testing of a software application by ensuring that a graphic user interface (GUI) element is visible so that it can be selected, and thus tested, by an automatic testing program. The term "visible" is defined herein as: a GUI element is visible if there is at least one visible point that belongs to the GUI element that is clickable on the screen. To be clickable, the point must both be visible, enabled, and must not be covered by another object.

For illustration purposes, listboxes and tree structures are used in the following detailed description as examples of visible GUI elements that may be made visible. However, it should be appreciated by those of skill in the art that the embodiments shown are not limited to listboxes and treeviews, but can be generalized to any other visible GUI control such as combo boxes, menus, multi-column listboxes, multi-column combo boxes, multiple selection extended listboxes, ACTIVEX controls, multi-line text boxes, controls incorporating radio buttons, toggle buttons and/or push buttons, scroll panes, tabbed panes, calendars, windows, and a wide variety of custom controls without standard names.

As described herein, the words control, element, item, and object are interchangeable, and also encompass ideas such as container. The idea behind all such listed words embraces any viewable object, combo boxes, menus, multi-column listboxes, multi-column combo boxes, multiple selection extended listboxes, multi-line text boxes, controls incorporating radio buttons, toggle buttons and/or push buttons, scroll panes, tabbed panes, calendars, windows, and combinations thereof. New implementations of viewable objects are being constantly created and the embodiments disclosed embrace viewable elements that have not formally been given a name.

The various technologies described herein are useful for ensuring that user interface items are visible, and thus can be selected by an automated testing program. User interface elements can take many forms, such as graphical pushbuttons, edit boxes, scroll bars, picklists, drop down menus, ACTIVEX controls, images and the like. User interface elements can appear as part of a program (e.g., to control functionality of the program) or within a document. Only if a user interface item is visible can it be selected by a testing apparatus that drives a target UI-based application using mouse, keyboard, or other user interface emulation. For example, graphical user interfaces (GUIs) allow users to choose many, many options at any given time. Among the myriad choices available, a user may open a new application, may select an item in an open application, or may choose to modify the operating system default settings.

Because of this flexibility, graphical user interfaces have an almost unlimited number of paths through them, at least a portion of which must be tested to ensure that the underlying programs are as bug-free as possible. Due to the infinite path problem, it can require an extended period of testing by people, either on-site, at beta sites to satisfactorily test a program including a graphical user interface. To counter this problem, automated testing procedures have been developed that mimic user keyboard and mouse input to more accurately exercise a number of the options available within a program with a GUI. However, to test an item within a GUI, it first must be visible, and selectable.

Throughout this discussion, the concept of scrolling is referred to in its most general terms. Different GUI elements will scroll in different ways; a GUI element such as a listbox may scroll differently in different operating systems or even in different programs running under the same operating system.

Overview

Figure 1B:
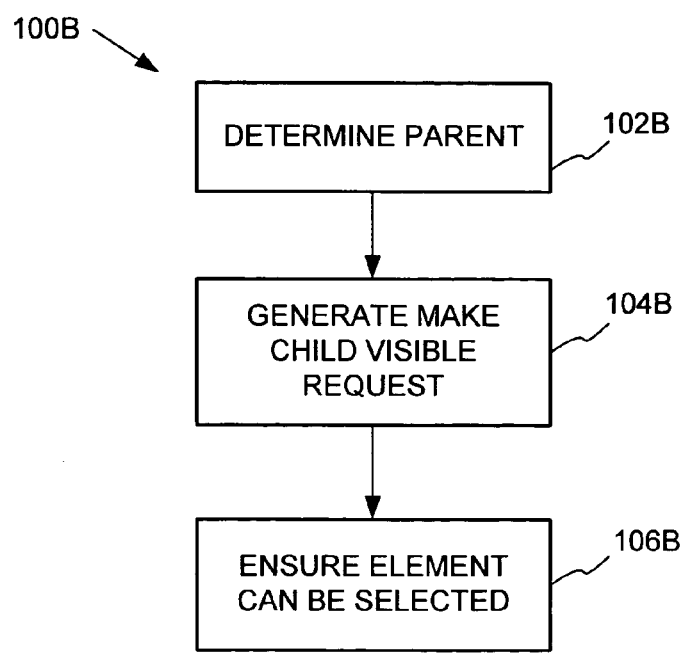
FIG. 1B is a flowchart illustrating an exemplary method for ensuring a user interface element is visible

Referring to FIG. 1B, flowchart 100B shows a brief overview of the methods disclosed herein. A user interface element to be made visible is selected. This selection may be done by a user interface testing program. At process block 102B, the parent of the user interface element is determined. Generally, if an element in a listbox needs to be made visible, one must know the listbox associated with the element. This process block makes that determination. At process block 104B, a make child visible action is performed. This procedure, more fully explained with reference to FIG. 2, makes the user interface object visible on the screen. However, visibility is sometimes insufficient to ensure that the object is selectable, as another box could be covering it, the window that the object belongs to may not have focus, or something else could be affecting selectivity. This procedure checks to ensure that the visible object is selectable.

Figure 2:
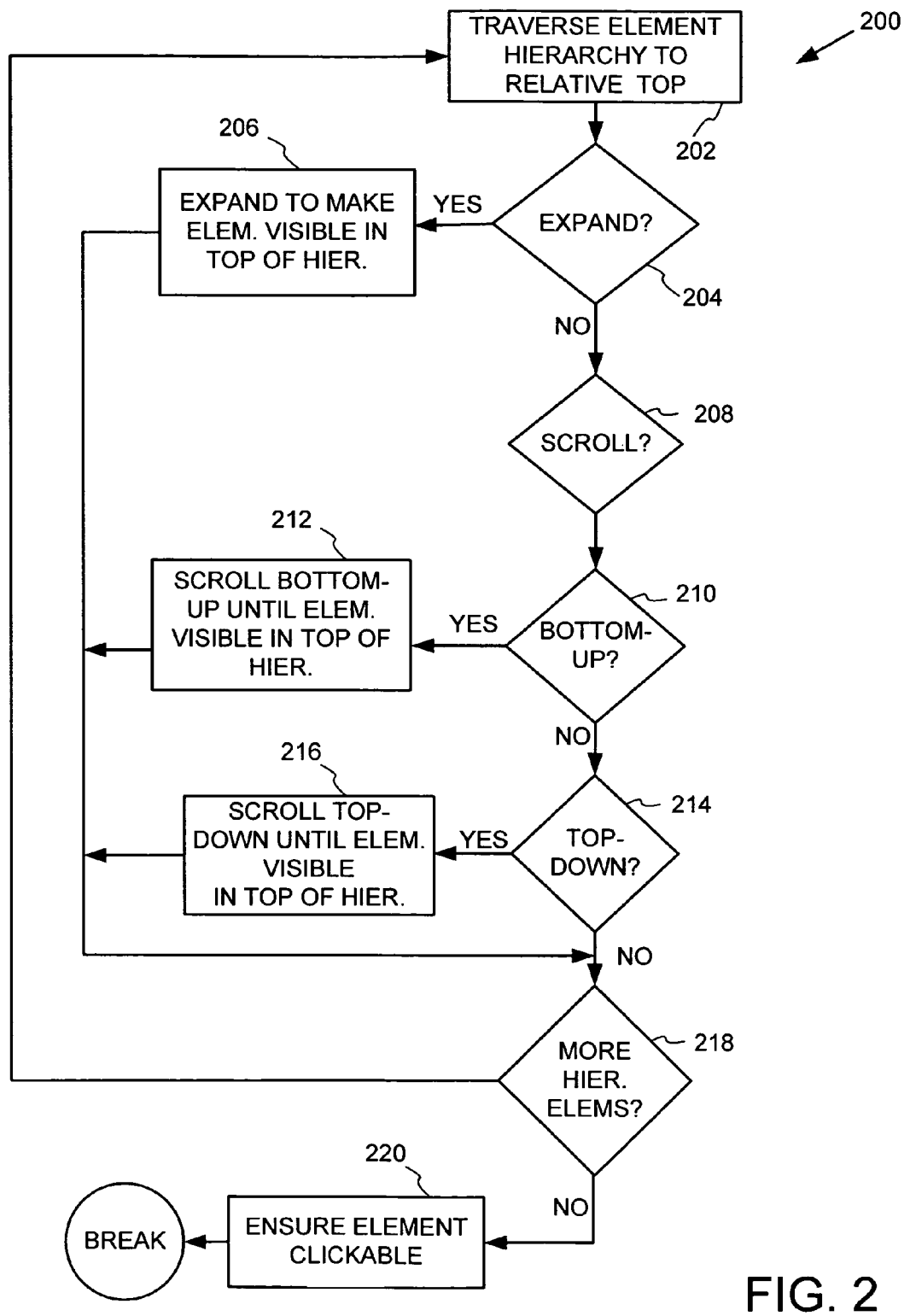
FIG. 2 is a flowchart illustrating an exemplary method for ensuring a user interface element is visible that extends some of the method acts detailed in FIG. 1A.

An exemplary method 200 shown in the flowchart of FIG. 2 can be utilized to perform make child visible actions as shown at process block 104B. The exemplary method 200 represents a particular embodiment that expands the exemplary methods described above and should not be construed as limiting in any way. Instead, the method may be modified in arrangement and detail without departing from the scope of the disclosed technology. For example, certain acts described may be omitted in particular embodiments, and certain acts may be performed in an order different that that shown.

Some composite screen objects exist which require a combination of scrolling and expanding to ensure that a specific element appears. For such objects, a section of their hierarchical tree handled with a top-down approach, and another section of the tree handled with a bottom-up approach, as necessary, with some element families being made visible using bottom-up approach, and other element families being made visible using a top-down approach. This is represented in process block 202, where the relative hierarchical top of a given user interface object is determined.

If the object is of the sort to be expanded 204, such as, in some embodiments, a treelist, it is then expanded 206. The expansion can either be bottom-up or top-down. If the object is of the sort to be scrolled 208, there are two possibilities: either the object and its hierarchical parents are scrolled bottom up 210 or they are scrolled from the top down 214. This may still not ensure the objects visibility on screen, because there still may be another level of expansion or scrolling that must occur, in which case the process repeats itself 218.

As shown at process block 210, in certain embodiments, a user interface element can be made visible using a bottom-up approach, where the parent of the user interface element is scrolled until the user element appears within the parent object's client area. This operation is performed recursively until the top object of the user interface element of the hierarchy is reached. Subsequently, the parent object of the user interface object is scrolled until the user interface object is visible in the grandparent object. This operation is also performed recursively until the user element appears with the top element in the hierarchy, and is therefore visible on screen. Once the element is visible, it can then be selected by the automated testing program. An exemplary embodiment uses the bottom-up approach when bounding rectangles of the user interface element and its hierarchical ancestors are known.

In other embodiments, as shown at process block 216, a user interface element can be made visible using a top-down approach, where the hierarchically-top element is scrolled until its child element is visible. This operation is performed recursively until the user interface element is reached. An exemplary embodiment uses the top-down approach when bounding rectangles of the user interface element and its hierarchical ancestors are not known.

As shown at process block 216, in certain embodiments, the user interface element is hidden because its view is collapsed, such as if it is a hidden node in a treeview. In some such cases, the element is expanded, with all of the parent elements also being expanded, bottom-to-top, up the element hierarchy. This guarantees that the original element is visible. In other embodiments where the element is hidden because its view is collapsed, the element hierarchy is traversed to the top viewable element, and then the tree is traversed from top to bottom, with each expandable node being expanded in turn. The full view of a representation of the expanded objects may be complex enough that the entire expanded view will not fit on the screen. In such a case, the original user interface element is displayed, along with such portions of the element hierarchy as will fit on the screen.

Sometimes, a user interface element is not visible because one or more objects not associated with its window or thread are on top of it, blocking the view. Other times, the user interface element can be seen, but still cannot be selected, as another object is situated over it. In such cases, the user interface element and its associated window is pushed to the front of the screen, by giving the window focus, by adjusting the Z-axis position, by making the thread associated with the window the foreground thread, or by some other means. This ensures that the to-be-selected element is on the top window in the display, and thus, is visible and selectable. This is represented at process block 220.

The flowchart 200 shows only one exemplary embodiment and should not be construed as limiting in any way. For example, the decision to expand or scroll an item made in the flowchart at process blocks 204 and 208 can be made in other locations, such as prior to the hierarchy being traversed. The method 200 may be carried out by a testing tool that is resident in computing environment 100A and may be implemented in software, hardware, or a combination of both.

If desired, the technologies described herein (e.g., ensuring that an item to be tested is visible) can be provided as part of an automated testing service. Different types of objects can have different instantiations of the methods disclosed herein, as suits their nature. Programs interacting with the service can thus take advantage of the features as desired.

Figure 3:
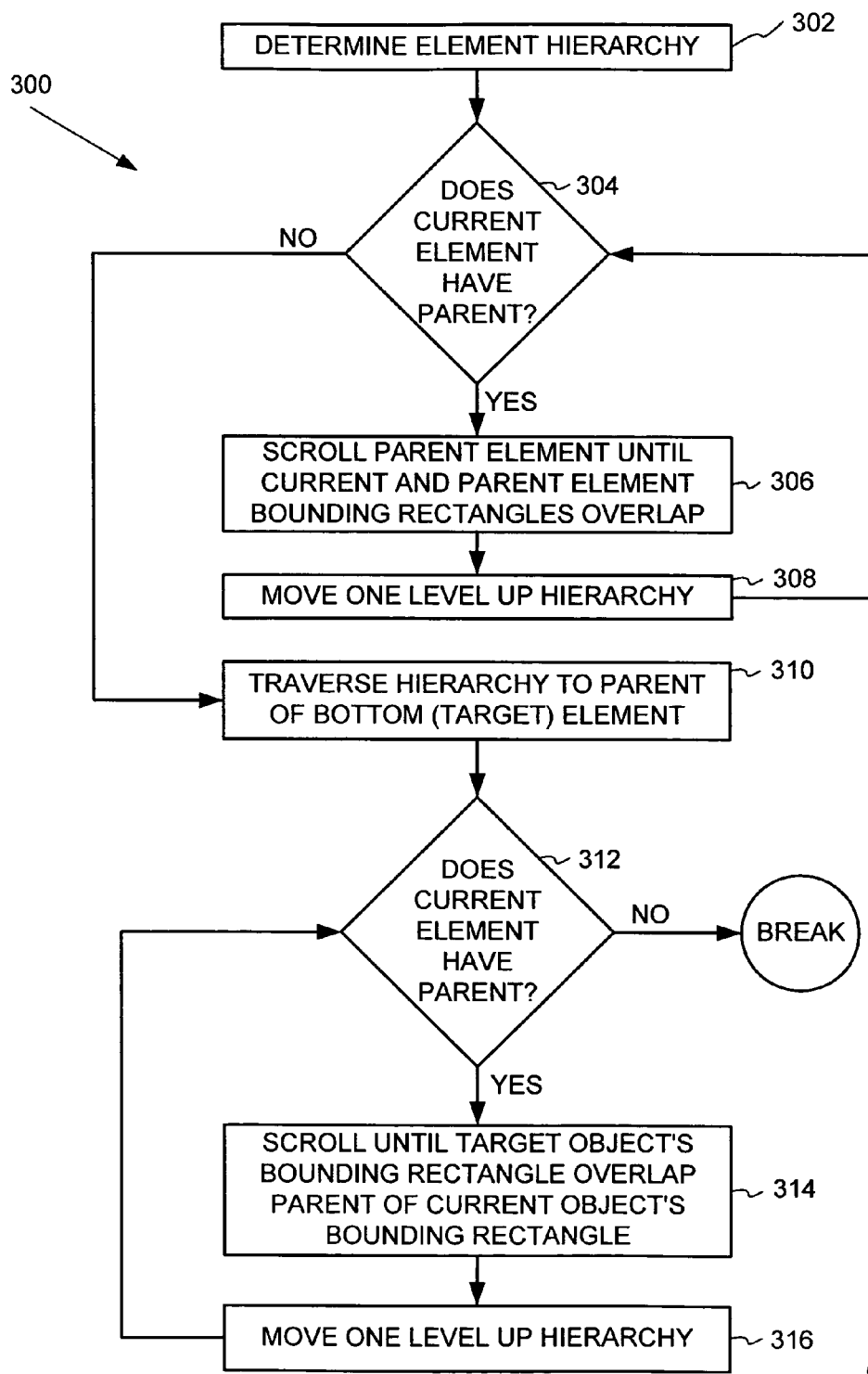
FIG. 3 is a flowchart illustrating an exemplary method for ensuring a user interface element is visible that extends some of the method acts detailed in FIG. 2.
Figure 4A:
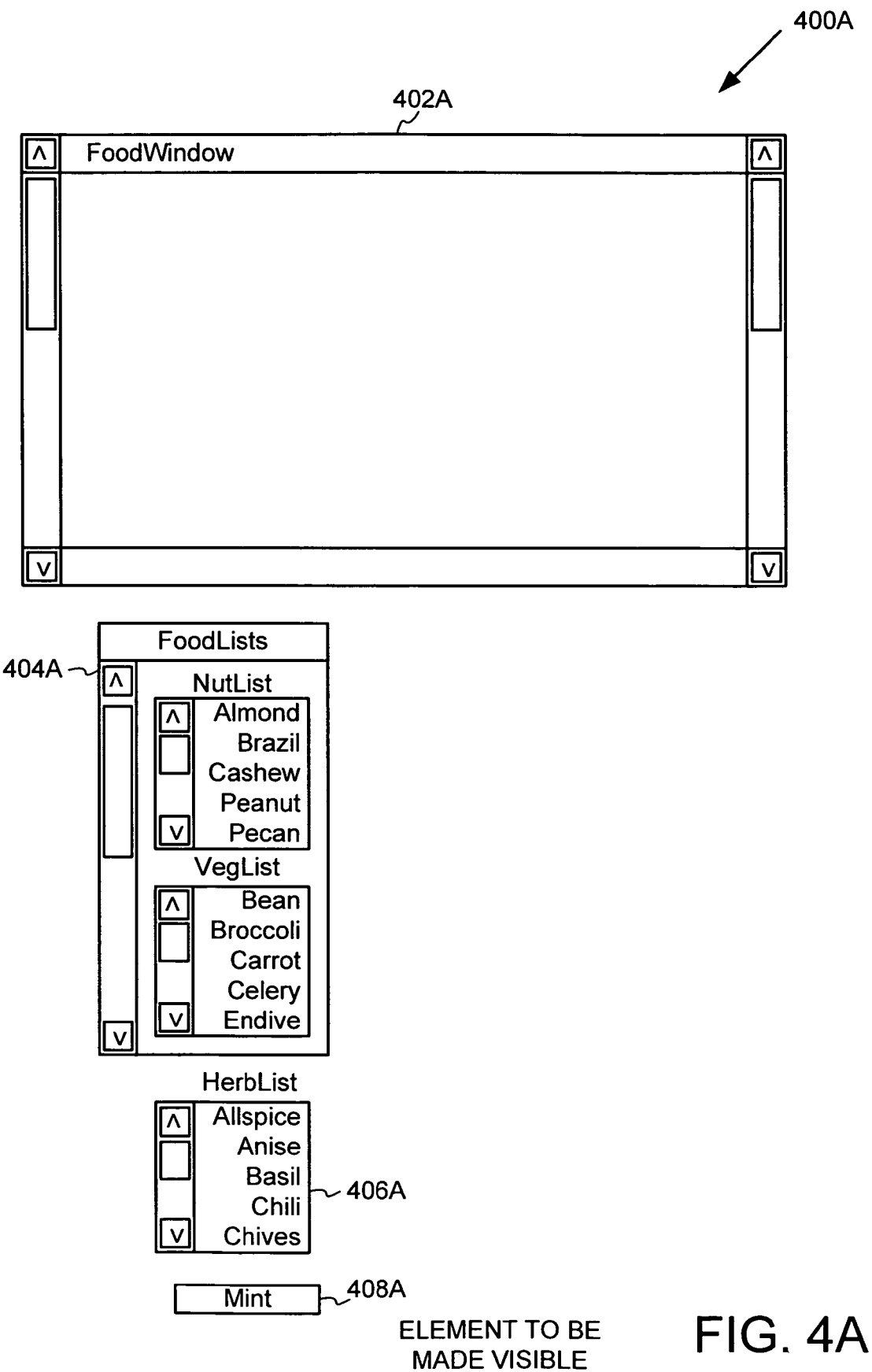
FIG. 4A is a depiction of an exemplary user interface window.

Exemplary Bottom-Up Method for Ensuring an Element in a User Interface is Visible FIG. 3 is a flowchart 300 of a basic procedure for implementing a disclosed embodiment of making a UI object visible. The flowchart 300 shows only one exemplary embodiment and should not be construed as limiting in any way. FIGS. 4A-4H are, collectively, example illustrations utilizing the procedure disclosed in FIG. 2. and further amplified in FIG. 3. This bottom-up approach may be used when the bounding rectangles of controls are known. The bounding rectangles of controls may be known when the controls are standard ones created using tools provided by the operating system, or when such rectangles are otherwise specified when created. FIG. 4A shows an exemplary user interface 400A with a target user interface element—labeled "Mint" 408A— that is to be made visible.

For an element to be visible, it must be physically within the bounds of the window that owns it. Similarly, each element within a control must be physically within the bounds of the control window (i.e. displayed within it) for it to be seen. The user interface element "Mint" 408A is an element in the listbox "HerbList" 406A, which is currently out of sight, as it is not currently present in the "HerbList" listbox view window. "HerbList" 406A is itself an element in the listbox "FoodList" 404A. The listbox "FoodLists" 404A belongs to window "FoodWindow" 402A, but is currently scrolled below the window and so also cannot be seen.

Figure 4B:
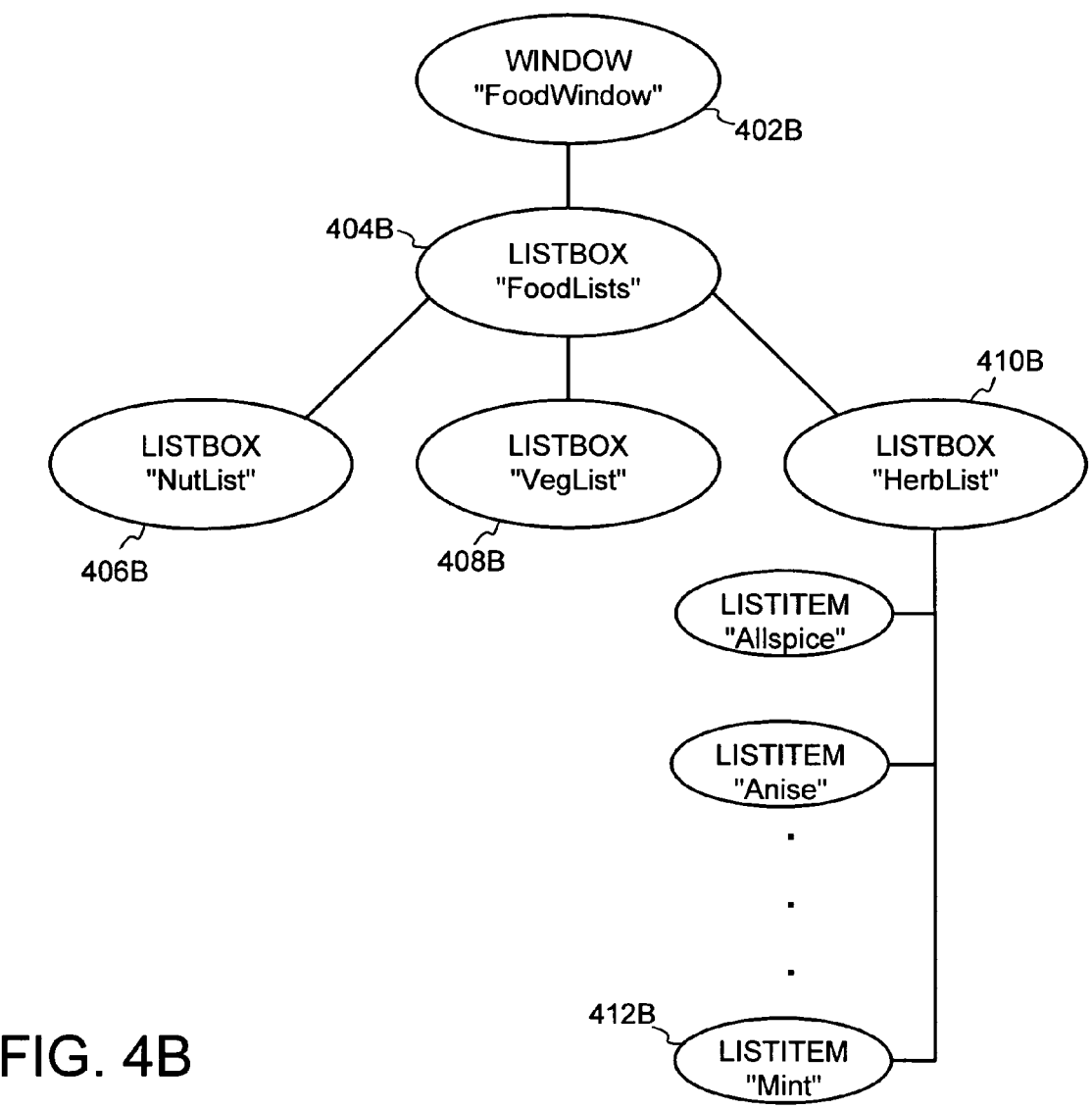
FIG. 4B is a depiction of a hierarchical representation of the user interface window of FIG. 4A.

One common way to represent a user interface element in software is to store it in the form of a hierarchical tree having various nodes. FIG. 4B shows an exemplary hierarchical representation of the user interface elements shown in FIG. 4A. The nodes 402B-412B are shown as having a parent-child relationship. Notice the complex nature of the relationship, as user interface elements can be the parent nodes for representations of other user interface elements. In this embodiment, the listbox "FoodLists" 404B is the parent of three children listboxes 406B, 408B, and 410B ("NutList", "VegList", and "HerbList", respectively).

FIG. 3 is a flowchart 300 of a basic procedure for ensuring objects to be tested are visible, utilizing the concepts discussed above. The flowchart 300 shows only one exemplary embodiment and should not be construed as limiting in any way. These steps may be carried out by a testing tool that is resident in computing environment 100A and may be implemented in software, hardware, or a combination of both.

Figure 4C:
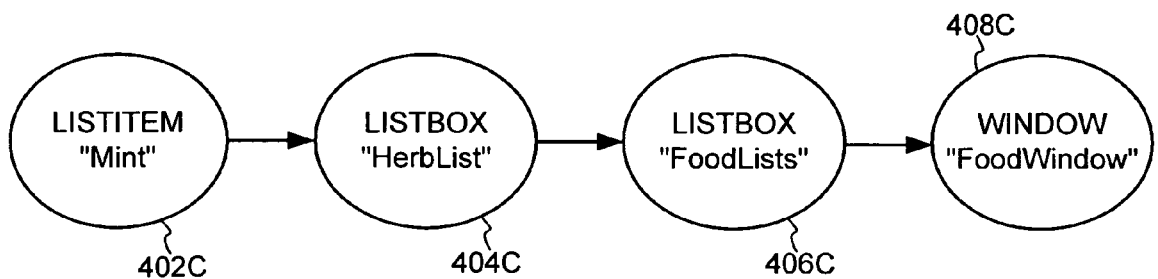
FIG. 4C is a depiction of a single node hierarchy in the hierarchical representation of FIG. 4B.

At process block 302, the hierarchy of the element I wish to make visible is determined. FIG. 4C is a simplified view of the interface elements shown in FIG. 4B displaying the node hierarchy associated with the interface element labeled "Mint" 408A that is to be made visible. As can be seen, the hierarchy shown in FIG. 4B is traversed beginning with the element to be made visible, labeled "Mint" 402C, locating its direct parent "HerbList" 404C, then to "FoodLists" 406C, and on to the top of the hierarchy "FoodWindow" 408C.

At process block 304, it is determined if the current element has a parent. If so, the process continues at process block 306; if not, the process continues at process block 310. Turning to FIG. 4C, it can be seen that "Mint" 402C, the current element does have a parent, "HerbList" 404C.

Figure 4D:
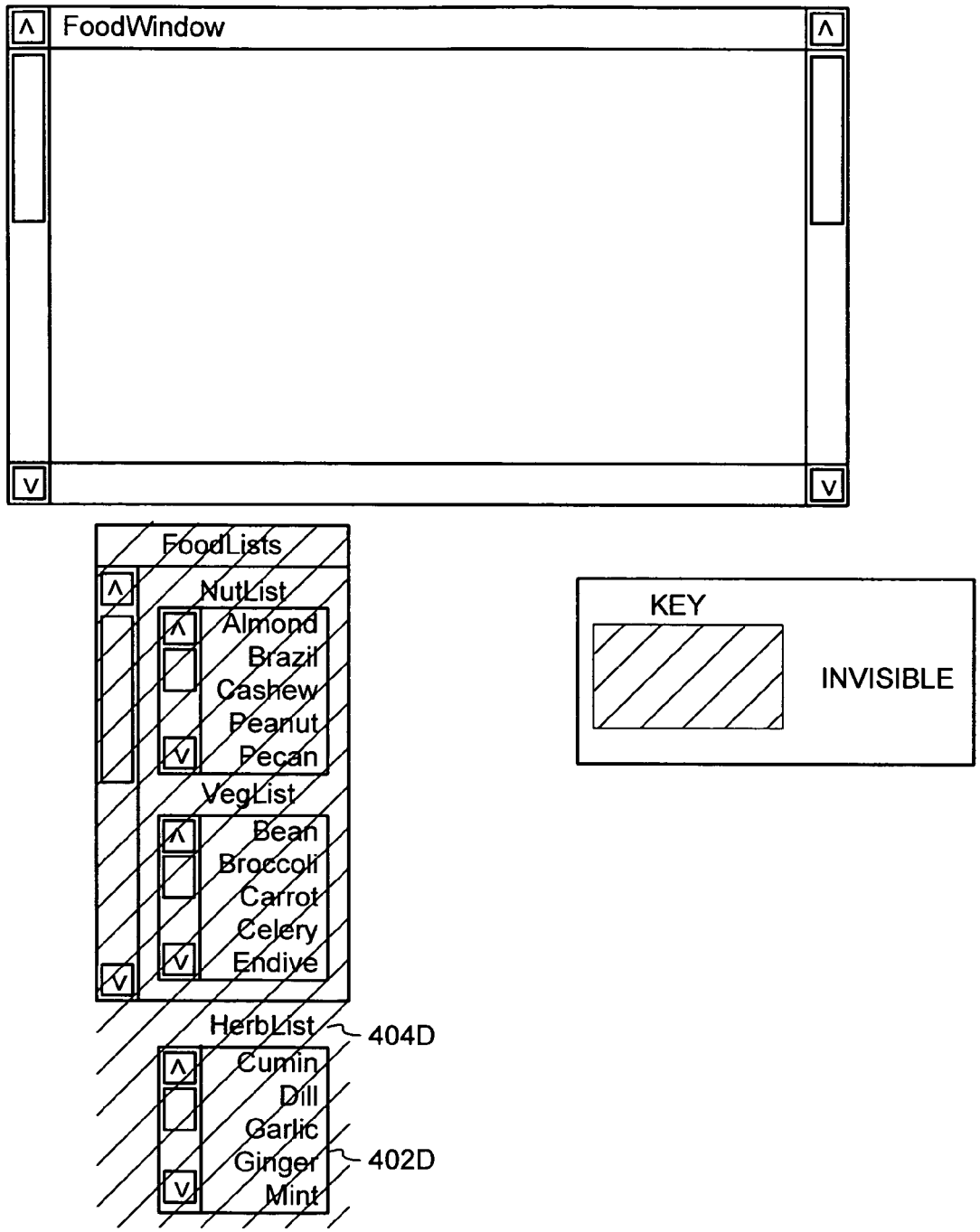
FIG. 4D is a depiction of an intermediate representation of the user interface of FIG. 4A when the method disclosed in FIG. 3 is implemented.

At process block 306, the current element (Mint 402C in the exemplary embodiment) is moved (scrolled in the case of a listbox) until it overlaps its parent ("HerbList" 404C). The movement necessary for a given element is implementation-specific; but can be easily ascertained by one of skill in the art. Referring to FIG. 4D, "HerbList" 404D is scrolled until the element "Mint" 402D overlaps the view area of the listbox "HerbList" 404D. In some cases, an object will need to be moved in more than one direction for the two objects to overlap.

Figure 4E:
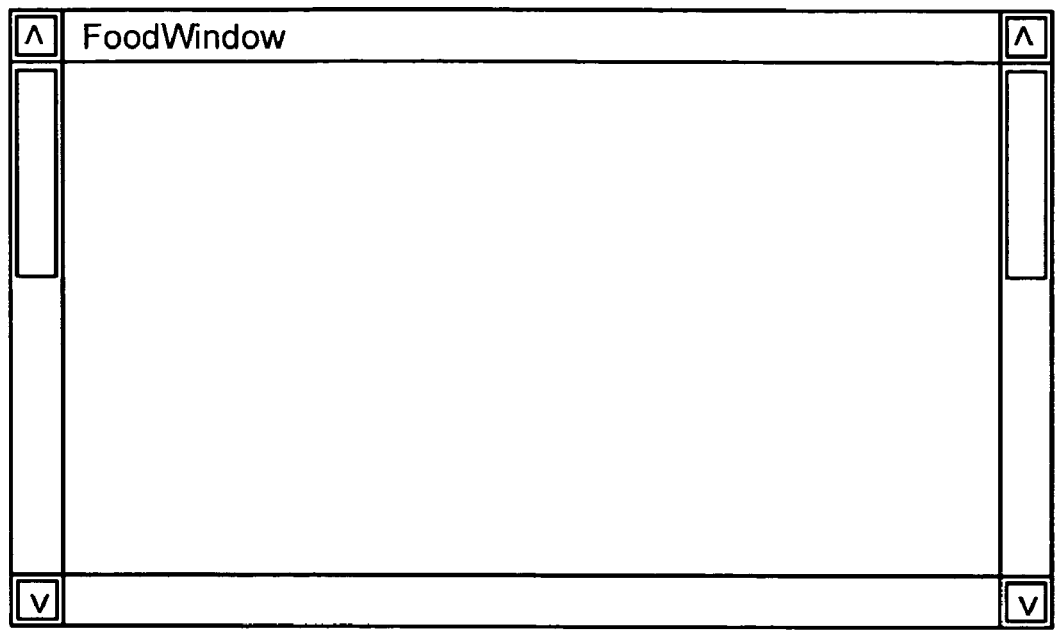
FIG. 4E is a depiction of another intermediate representation of the user interface of FIG. 4A when the method disclosed in FIG. 3 is implemented.
Figure 4E:
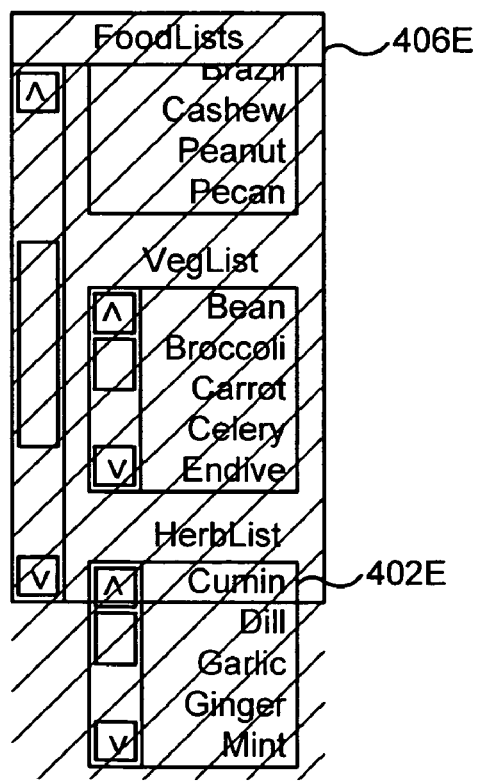
Figure 4F:
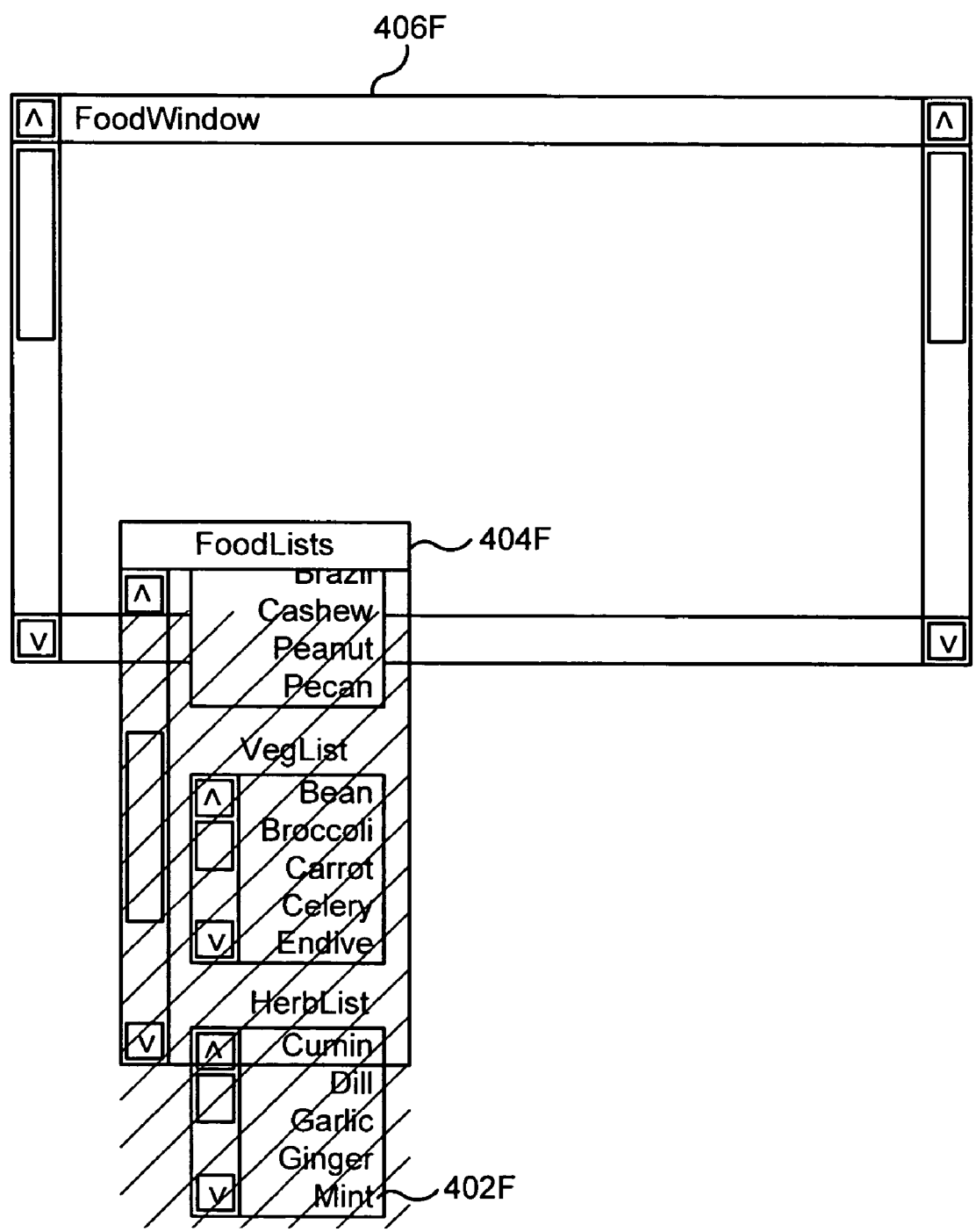
FIG. 4F is a depiction of another intermediate representation of the user interface of FIG. 4A when the method disclosed in FIG. 3 is implemented.

At process block 308, the hierarchy is moved up one level, having the effect of making the (formerly) parent element the current element. With continuing reference to FIG. 4C, "HerbList" 404C, the parent of "Mint" 402C, is made the current element. The process continues at process block 304, where it is determined that the current element "HerbList" 404C has a parent "FoodLists" 406C. Then, as shown in FIG. 4E, at process block 306, the current element "HerbList" 402E is scrolled until it overlaps "FoodLists" 406E. Repeating process blocks 304, 306, and 308, FIG. 4F shows "FoodLists" 404F overlapping its parent "FoodWindow" 406F.

Figure 4G:
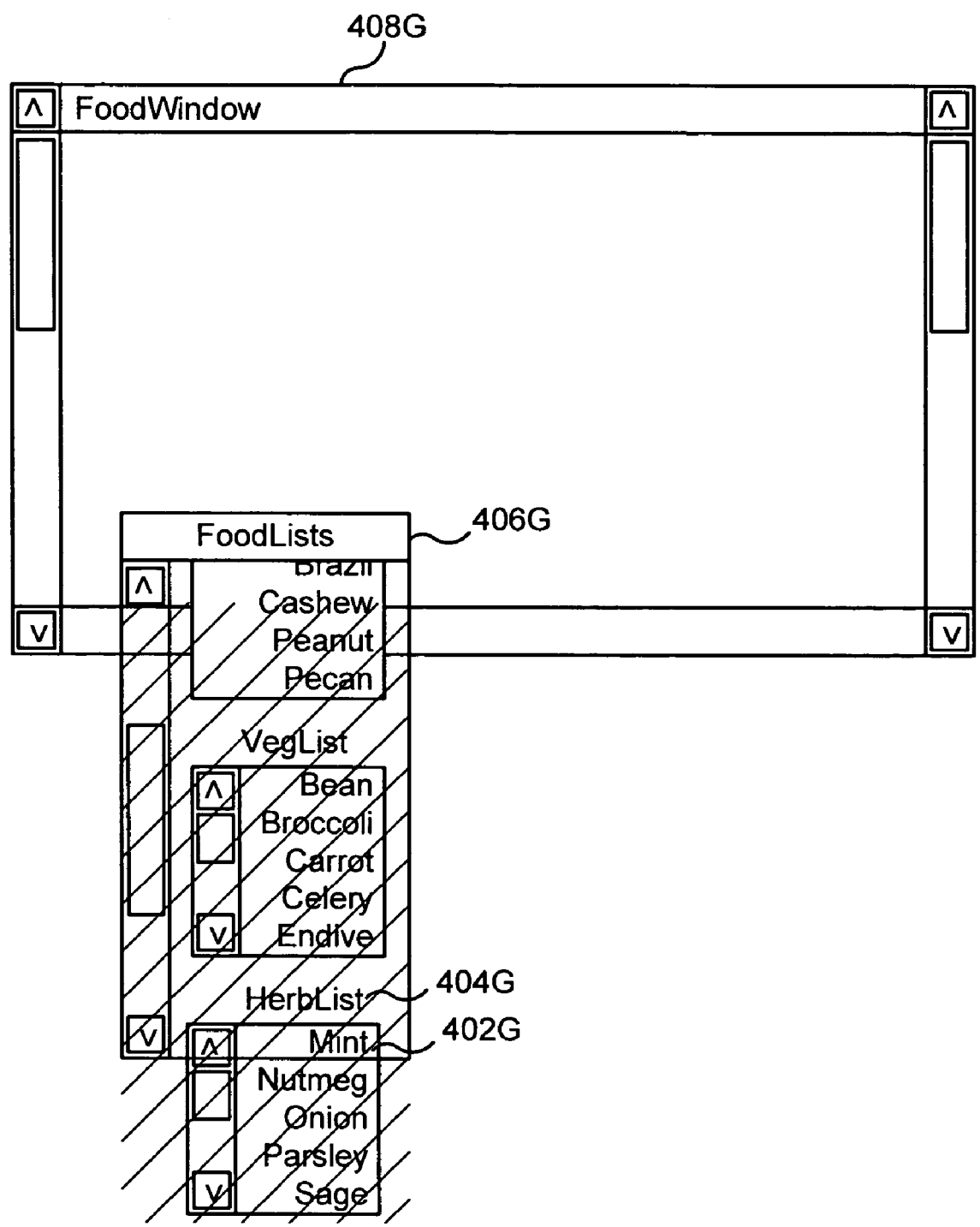
FIG. 4G is a depiction of another intermediate representation of the user interface of FIG. 4A when the method disclosed in FIG. 3 is implemented.

Once the hierarchy has been traversed to the top element, the process continues at process block 310. As can be seen in FIG. 4F, the target element to be made visible ("Mint" 402F) may still be outside the visible object at the top of the hierarchy. To ensure the target element is visible, each parent element in the hierarchy is scrolled, from bottom to top, to expose the child element in the grandparent element. At process block 310 the object hierarchy is traversed, again, from top to the parent of the element to be made visible, "HerbList" 404C, as shown in FIG. 4C, which then becomes the current element. In process block 312 it is determined if the current element has a parent element. If not, the process ends. If there is a parent element, the process continues at process block 314. In process block 314 the current object scrolls until the target object's bounding rectangle overlaps the bounding rectangle of the parent of the current object. Referring to FIG. 4G, the current object "HerbList" 404G scrolls until the bounding rectangle of the target object "Mint" 402G overlaps the bounding rectangle of "HerbList" 404G's parent object "FoodLists" 406G. However, "HerbList" 404G and "Mint" 402G are still not visible within "FoodWindow" 408G.

Figure 4H:
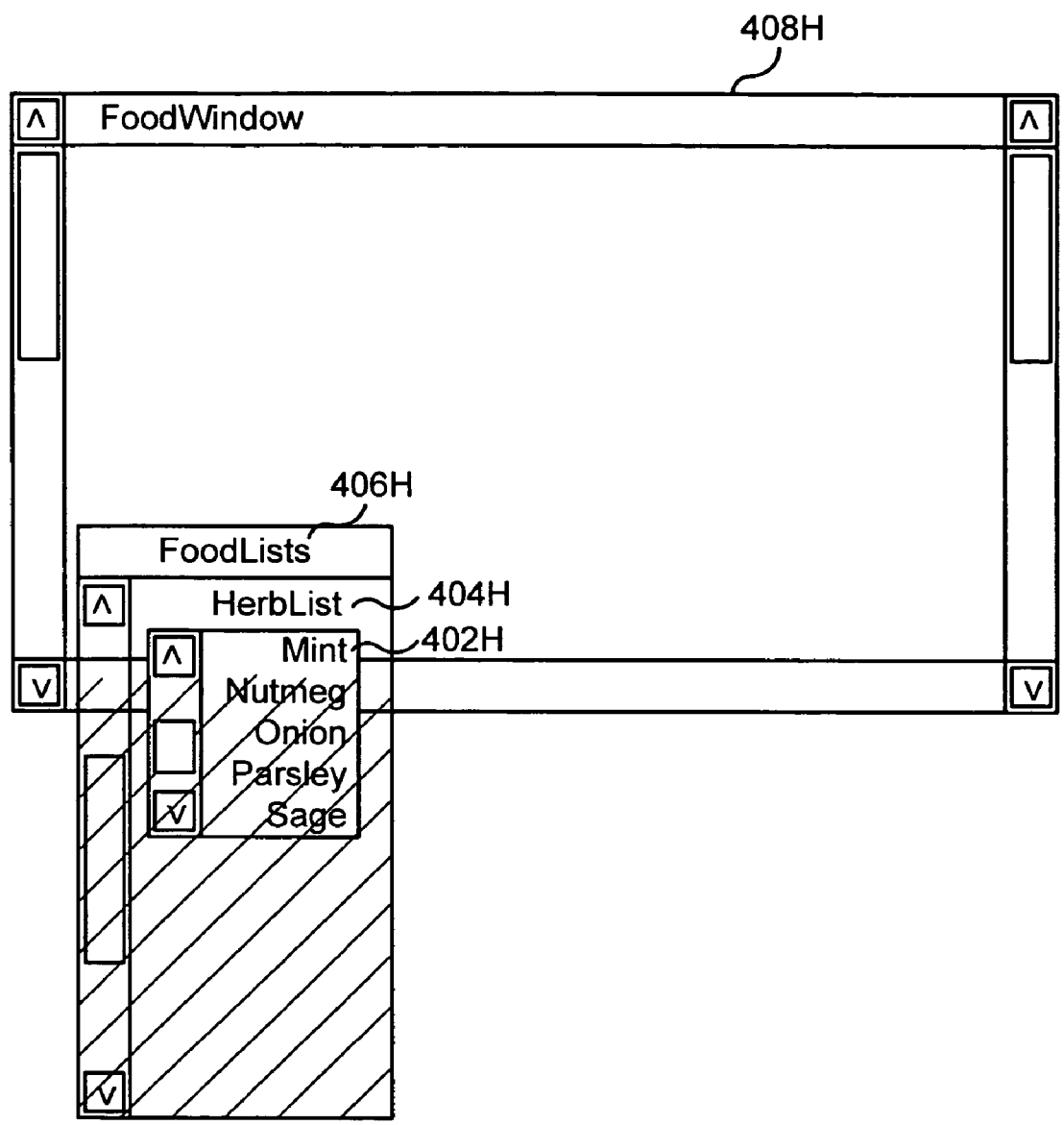
FIG. 4H is a depiction of a final representation of the user interface of FIG. 4A when the method disclosed in FIG. 3 is implemented.

At process block 316 the hierarchy is moved up one level with the parent element of the current element becoming the new current element. Process blocks 312, 314, and 316 are then repeated until the process arrives at an element without a parent element. FIG. 4H shows the result of the next iteration of this process, with the current element "FoodLists" 406H scrolling until the bounding rectangle of the target object "Mint" 402H appears within "FoodLists" 406H parent, "FoodWindow" 408H. This exposes the element labeled "Mint" 402H within its hierarchically top element "FoodWindow" 408H, making "Mint" 402H visible. Once at the top of the hierarchy, with no parent element, as determined at process block 312, the process ends with the original element to be made visible "Mint" 402H now visible within its hierarchically top-most element.

Figure 5:
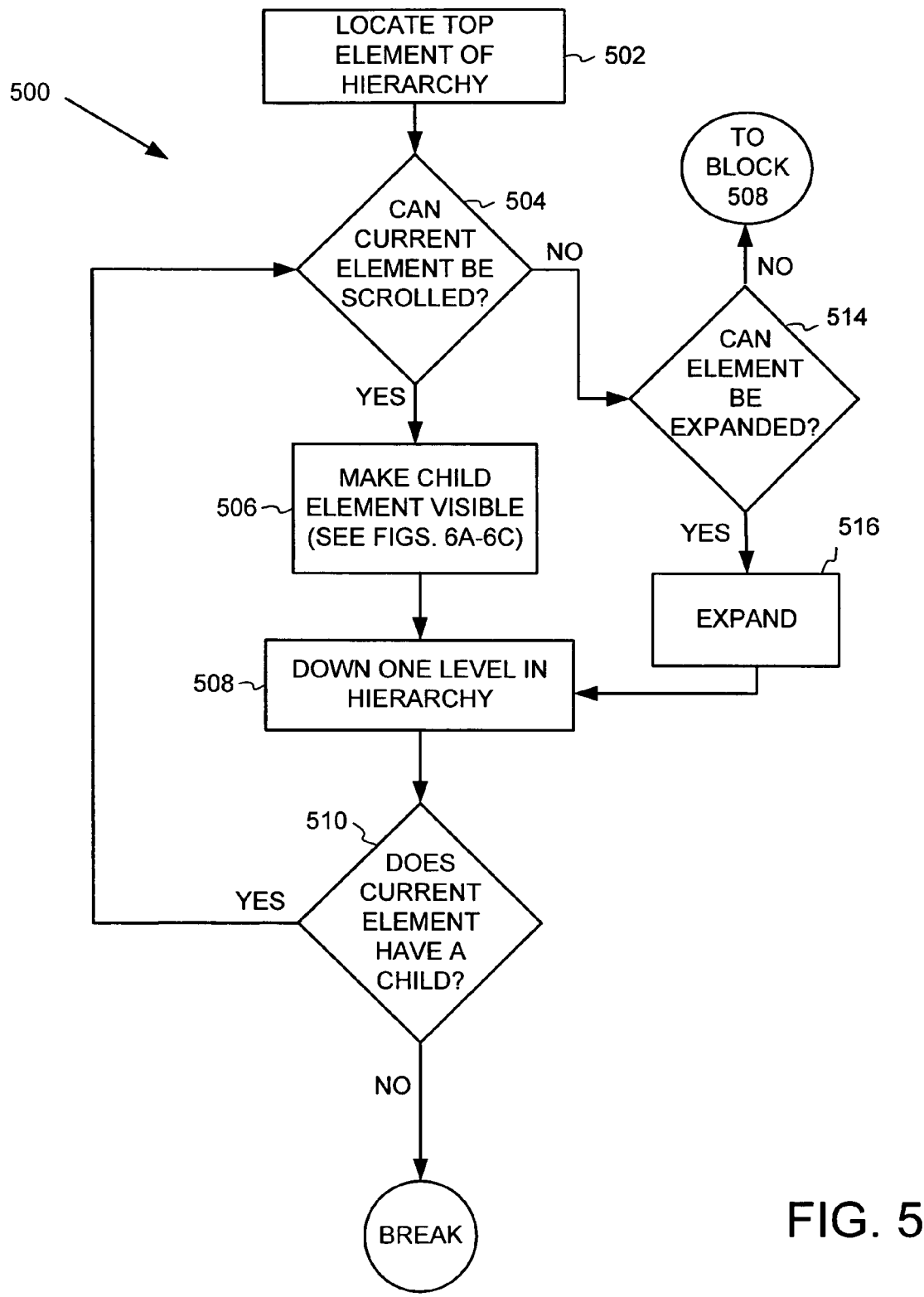
FIG. 5 is a flowchart of another exemplary method for ensuring a user interface element is visible that extends some of the method acts detailed in FIG. 2.

Exemplary Top-Down Method for Ensuring an Element in a User Interface is Visible FIG. 5 is a flowchart 500 of a basic procedure for implementing a disclosed embodiment of making a UI object visible using a top-down method. In an exemplary embodiment, the following method is employed to make such objects visible. With reference to the flowchart of FIG. 5, once a target object to make visible has been chosen, the target object's hierarchy is traversed until the object at the top of the hierarchy is reached 502. This gives a list of all objects which might need modification to ensure visibility of the target object.

Figure 6A:
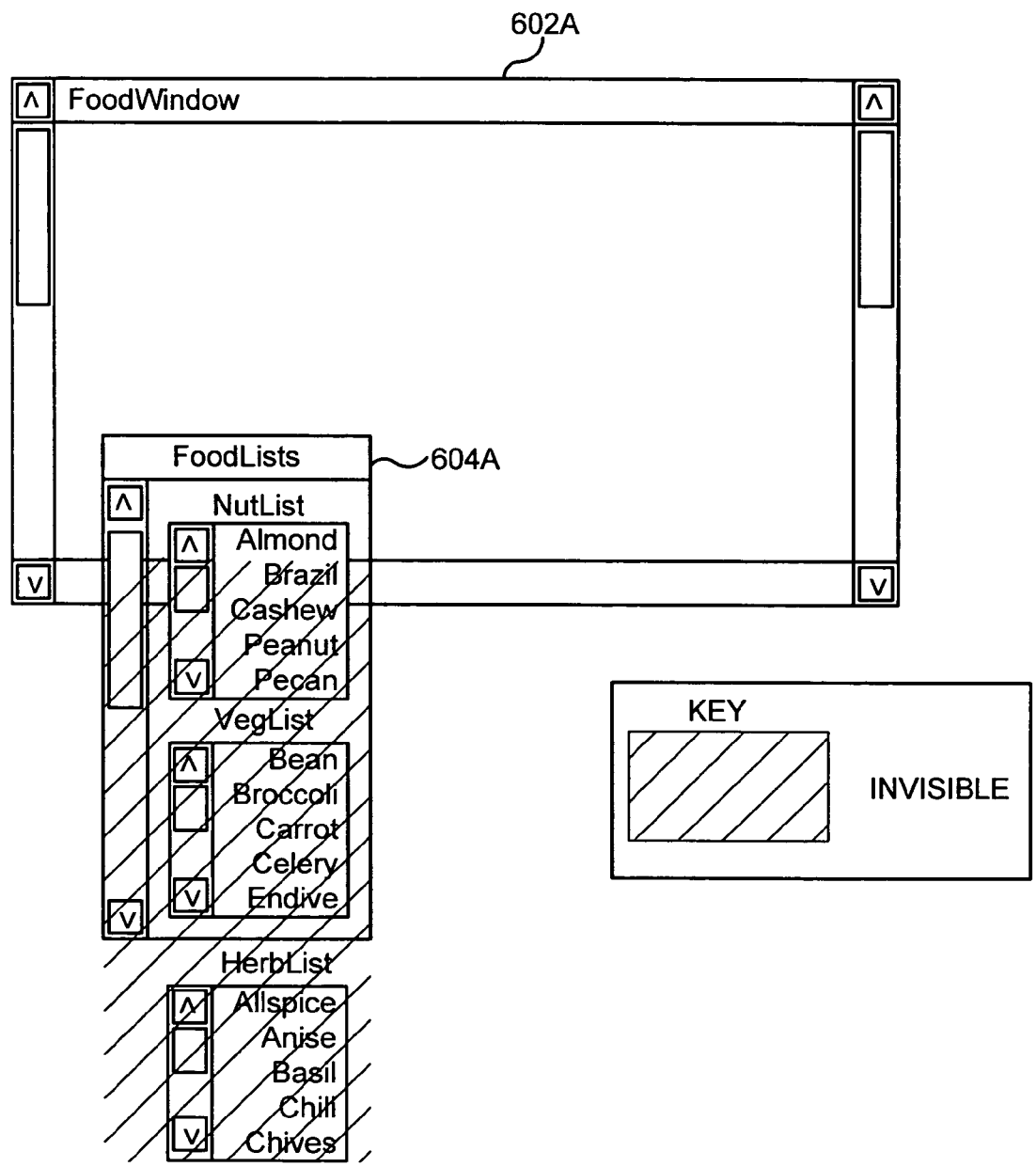
FIG. 6A is a depiction of an intermediate representation of the user interface of FIG. 4A when the method disclosed in FIG. 5 is implemented.
Figure 6B:
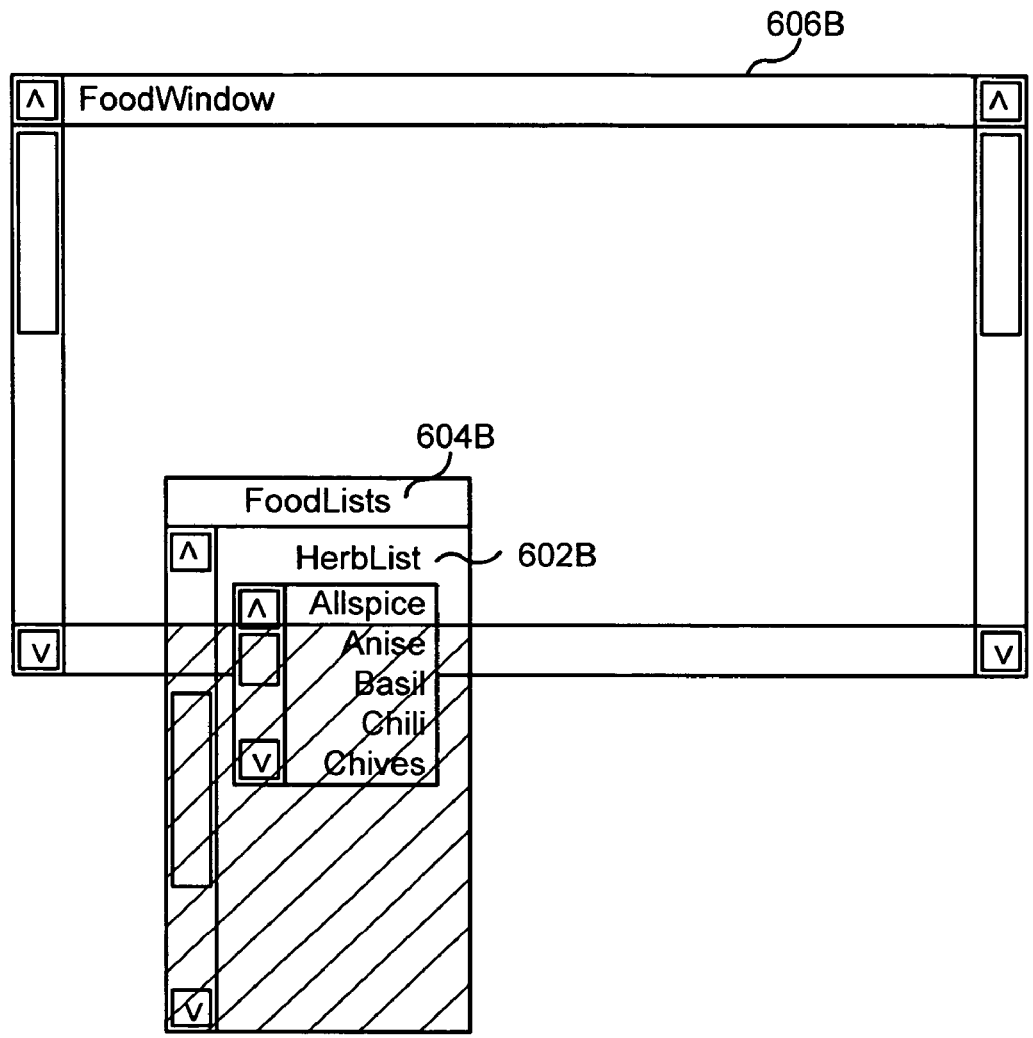
FIG. 6B is a depiction of an intermediate representation of the user interface of FIG. 4A when the method disclosed in FIG. 5 is implemented.
Figure 6C:
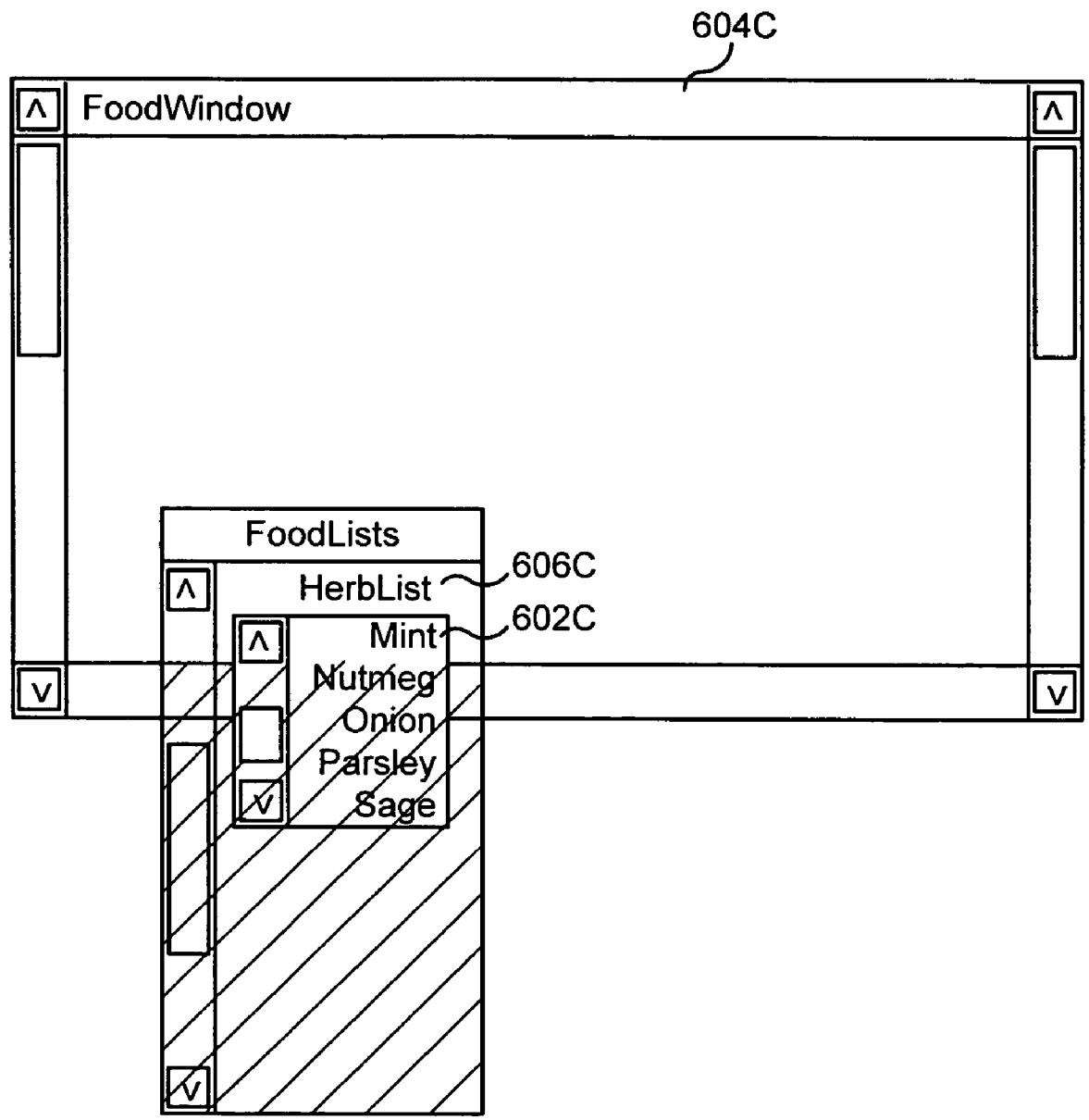
FIG. 6C is a depiction of a final representation of the user interface of FIG. 4A when the method disclosed in FIG. 5 is implemented.

The flowchart 500 shows only one exemplary embodiment and should not be construed as limiting in any way. FIGS. 6A-6C are, collectively, example illustrations utilizing the procedure disclosed in FIG. 5, using the same user interface elements shown in the previous embodiment. Turning again to FIG. 4A, the user interface element labeled "Mint" 408A is to be made visible. For an element to be visible (or displayed) in this exemplary user interface, it must be physically within the bounds of the window that owns it.

FIG. 5 is a flowchart 500 of a basic procedure for ensuring objects to be tested are visible, utilizing the concepts discussed above. The flowchart 500 shows only one exemplary embodiment and should not be construed as limiting in any way. These steps may be carried out by a testing tool that is resident in computing environment 100A and may be implemented in software, hardware, or a combination of both.

Once a target element to make visible has been chosen, in process block 502 the target element's hierarchy is traversed until the element at the top of the hierarchy is reached. This gives a list of all objects which might need modification to ensure visibility of the target object. Turning again to FIG. 4C, the hierarchical representation of the element to be made visible—"Mint" 402C—is shown. The top element of the hierarchy is "FoodWindow" 408C. This becomes the current element. At the same time, the direct child element of the current element is determined. In the illustrated embodiment, the child element is "FoodLists" 406C. In process block 504 it is determined if the target element is scrollable. If so, the process continues at process block 506. If not, the process continues at process block 514.

At process block 506, the current element scrolls until the child element is displayed within the parent element. FIG. 6A shows the illustrated embodiment after the child element "FoodLists" 604A has been made visible within the top element of the hierarchy by being scrolled in window "FoodWindow" 602A until visible.

At process block 508, the hierarchy is traversed down one level, such that the current child element ("FoodLists" 604A in the illustrated embodiment) becomes the new current element. At process block 510, it is determined if the current element has a child element. If so, then the process continues at process block 504. If not, the process terminates.

FIG. 6B shows the result of the next iteration of the method herein described. "FoodLists" 604B is the current element, "HerbList" 602B is the child element; "HerbList" 602B is scrolled in "FoodLists" 604B until "HerbList" 602B is visible within "FoodWindow" 606B.

FIG. 6C shows the final iteration of the method for illustrated embodiment: "HerbList" 606C is the parent, "Mint" 602C is the child; "HerbList" 606C is scrolled until "Mint" 602C is visible in the hierarchically top form "FoodWindow" 604C.

If, at process block 504, the current element is not scrollable, at process block 514 it is determined if it is expandable. Sample expandable elements are treelists and combo boxes. If the current element is expandable, at process block 516 it is expanded; the process then continues at process block 508. If not expandable, the process continues at process block 508.

Figure 7:
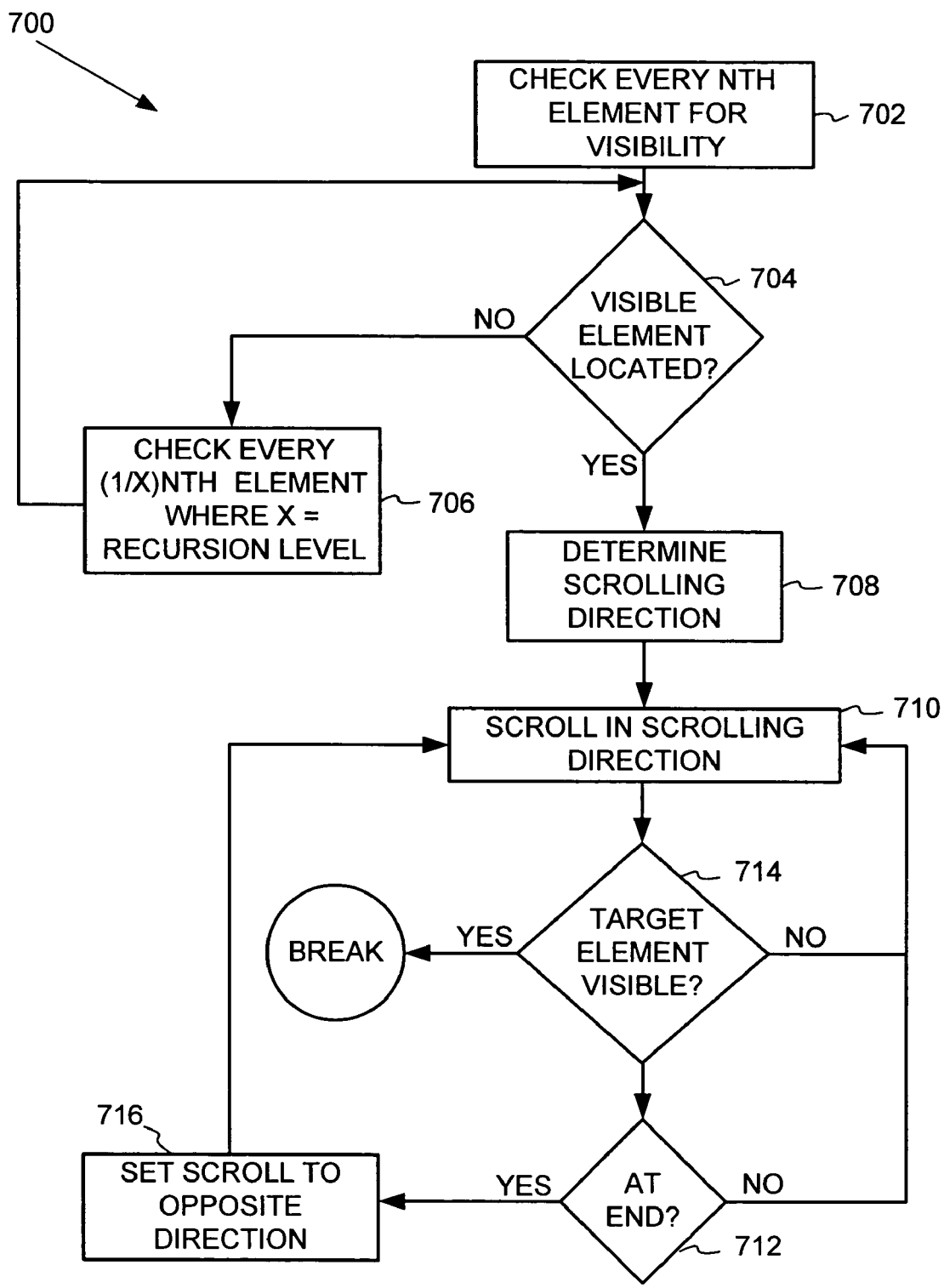
FIG. 7 is a flowchart of an exemplary method for ensuring that a user interface element is visible that extends some of the aspects of the procedure shown in FIG. 5.

An exemplary method 700 shown in the flowchart of FIG. 7 can be utilized to find elements and make them visible as shown at process block 506. The exemplary method 700 represents a particular embodiment that expands the exemplary methods described above and should not be construed as limiting in any way. Instead, the method may be modified in arrangement and detail without departing from the scope of the disclosed technology. For example, certain acts described may be omitted in particular embodiments.

Figure 8:
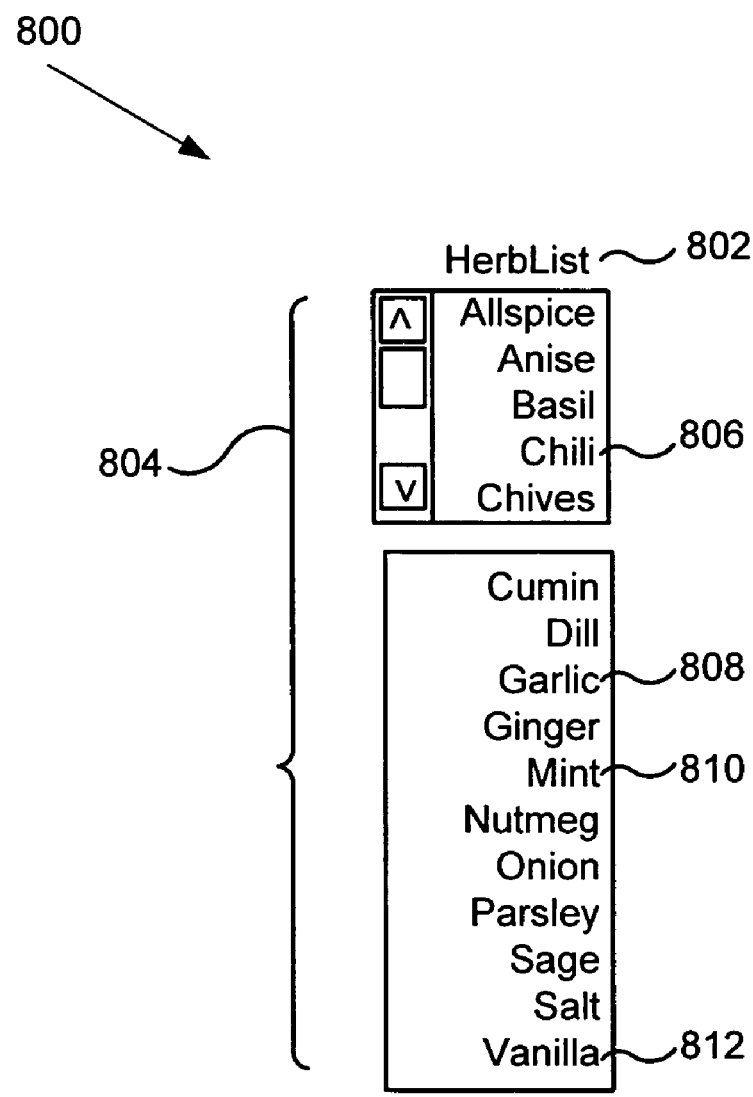
FIG. 8 is a depiction of a listbox used to illuminate the discussion of FIG. 7.

In process block 506, the current element is scrolled until its hierarchical child element is visible. An exemplary method of performing such scrolling is disclosed in flowchart 700. Initially, a search, described below, is performed to locate any visible child element within the current element. At process block 702, every n'th element is checked. In an exemplary embodiment, every N/2'th element is checked initially (where N is the total number of elements within the parent), though the optimal choice for n is implementation-dependent, and often the best value for n is difficult to determine. In one embodiment, when the total number of elements is 100, every $50^{th}$ element is checked initially. If the bottom of the list is reached with no visible item being discovered, each n/2'th element is checked, then each $n/4^{th}$ element, and so on. In some embodiments, each element that has been checked is marked in a hash table to ensure it is only checked once. With continuing reference to FIG. 8, the listbox 800 is used to illuminate some aspects of the method. The listbox "HerbList" 802, whose hierarchical representation is found at FIGS. 4B and 4C, is the parent node to the listitems "Allspice", "Anise", etc. 804. There are only 16 items in this listbox, so maxitems/2 (16/2) will be the original search parameter (an application-dependent instantiation). The eighth item is "Ginger" 808, and it is not visible, neither is the sixteenth item, "Vanilla" 812. At process block 704 it is determined if a visible element has been located. If so, the process continues at process block 708. If no element is located, the process continues at process block 706. At process block 706, the (1/x)n'th element is checked, where x equals the current recursion level. In the illustrated embodiment, since this is the second time that the list is being checked, every fourth element ((1/2)*8) is checked—"Chili" 806 is located and is visible. In one embodiment, information on which elements have already checked for visibility is stored to ensure that they are not rechecked. In some versions of this embodiment, the information is stored in a hash table.

In other embodiments, other search types can be used, such as a Fibonacci search, a jump search, or a linear search. After a visible element is found, a binary search is used to find the first visible element that will play a role of an anchor in the actual scrolling.

Once the first visible element is located, the scrolling direction is discovered by comparing the appropriate parameter of the target element to the visible element, usually a location parameter. In process block 708, the scrolling direction is determined. In some embodiments, the visible element number is compared with the target element number, and then the scrolling direction is set to the appropriate direction. Once the scrolling direction is determined, the element is scrolled 710 until the desired element is displayed 714 within the visibility area of the current (scrolling) element. Sometimes an end is reached prior to finding the element 712, in which case the scrolling direction is set to the opposite direction 716.

Referring again to FIG. 8, "Chili" 806 has an element number of 4, while the target element "Mint" 810 has an element number of 10, so the listbox will be scrolled down until "Mint" 810 is visible 714. Sometimes, though, an end is located before the desired element is found. At process block 712, it is determined if an end of the current element ("HerbList" 802) has been reached. If so, the process continues at process block 716, where the scroll direction is set to the opposite direction. Potentially, after scrolling some number of times in the same direction, the first visible element will not change. If so, this is an indication that the wrong direction is being scrolled in; again, in an exemplary embodiment the scroll direction should be set to the opposite direction.

Exemplary Embodiment to Ensure Window Accepts User Data

In some embodiments after the target element has been made visible within the target's window, visibility is ensured by making sure that a window associated with the user interface element is in a state to accept user input. In the case of keyboard input this is sometimes referred to as the window having focus. The window may not be in a state to accept user input, for example, if there is another window over top of the window associated with the user interface element, if the window is disabled, or, if the thread associated with the window is not the foreground thread. In different embodiments the following methods may be employed, though these examples are not to be considered limiting, and are often implementation-dependent. In one embodiment, the z-index is set such that the appropriate hierarchical object associated with the user interface element is at the front of the screen. The z-index is the value that a window has along the z-axis of the computer screen, which extends toward and away from the computer user. Generally, the window with the largest z-value is at the front of the screen and since it is not obscured, it is potentially ready for user input.

In another embodiment, a property is set which designates the window associated with the object to be made visible as the window that has focus. In yet another embodiment, a procedure such as "bring window to top" is implemented which ensures that the window is ready for user input. In another embodiment, it is determined whether or not an invisible element (such as clear rectangle) is in front of the user element to be selected. If so, the invisible element is relocated to a location which allows the element in question to be selected. In yet other embodiments, a number of these approaches are tried.

Exemplary System Embodiment

Figure 9:
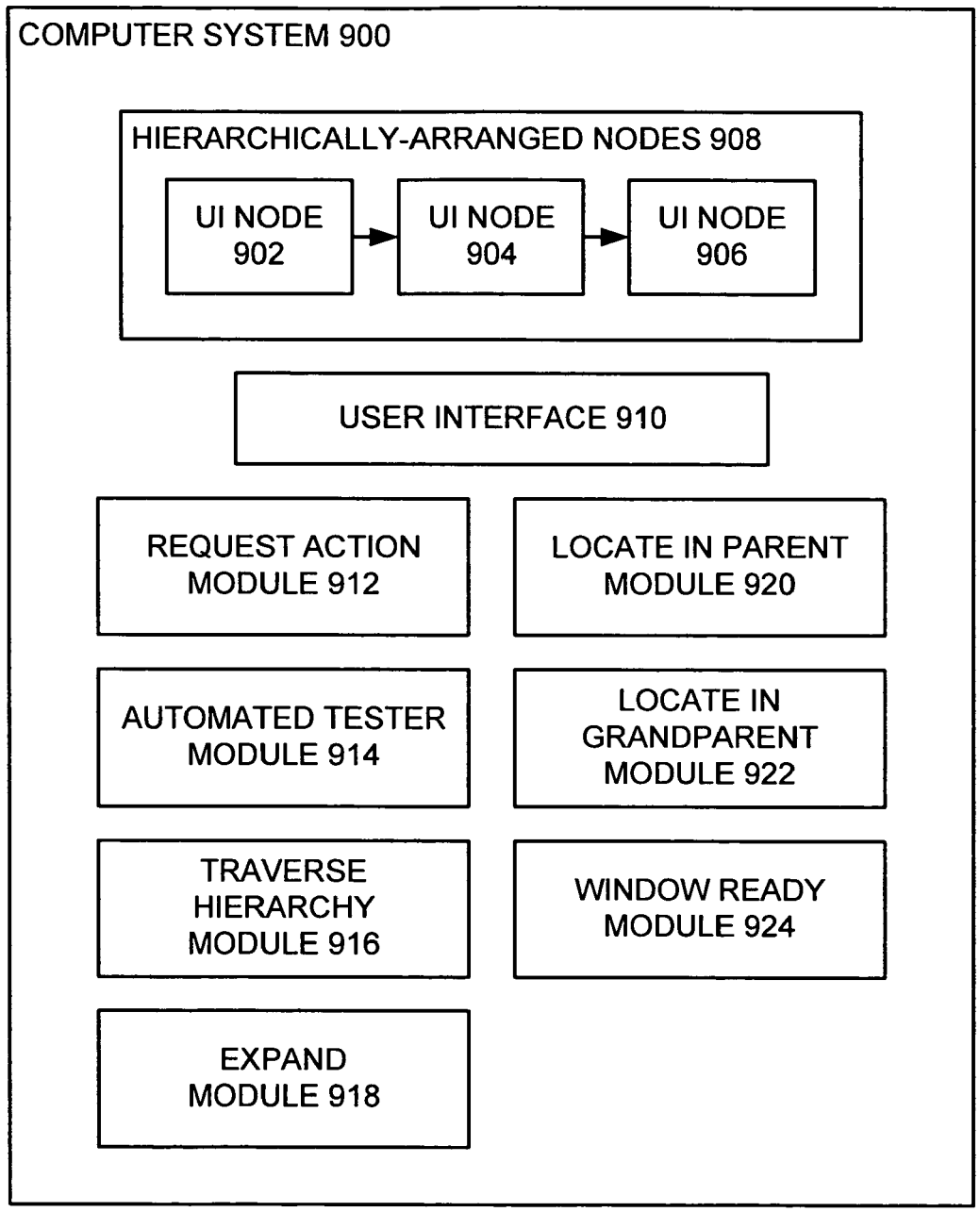
FIG. 9 is a block diagram of a computer system that can be used to implement making a user interface object visible

FIG. 9 illustrates another exemplary embodiment of a computer system 900 that can be used to implement making a user interface object visible. The computer system 900 has a user interface 910. It also contains user interface objects 902, 904, 906 which are hierarchically arranged 908. A typical arrangement is that a base user interface node 902, which is the user interface object to be made visible, such as an item in a listbox, is associated with a parent node 904, a listbox. The listbox 904 is itself associated with a window 906. Many other arrangements are possible.

The computer system 900 further comprises an automated tester module which may be located physically on the computer system 900 or which may be located at a remote location and connected to the computer system 900 through a communication link such as an intranet or the internet. A request action module 912 chooses a specific user interface element to test. This module may be part of the automated tester module 914, or may be a separate module. It may reside on the same computer as the UI node that is to be made visible 902 or may reside on a different computing system which can communicate with the computing system where the UI node resides that is to be made visible 902.

The system also comprises a traverse hierarchy module 916 which, when given a user interface node, can determine its parent objects that need to be considered to make the user interface node visible. For example, if given UI node 902, a listbox element, it could locate a parent listbox 904, and the window 906 that the parent listbox belongs to.

Sometimes complex elements require both scrolling and expansion to make a desired element visible. Block 918 shows the expand module. This module is used to expand elements, such as treeviews, where scrolling is not appropriate.

A locate in parent module 920 is also included. This module locates a child object within a parent object. For example, with reference to FIG. 8, this module could locate the element labeled "Mint" 810 within the listbox "HerbList" 802.

Block 922 shows the locate in grandparent module 922. With reference to FIGS. 4G and 4H, this module scrolls a parent object to make a child object visible within a grandparent object. In FIG. 4G, the child object "HerbList" 404G is visible within the parent object "FoodLists" 406G, but cannot be seen within the grandparent object "FoodWindow" 408G. In FIG. 4H, the parent object "FoodLists" 406H has scrolled the child object "HerbList" 404H so that "HerbList" 404H can now be seen in the window "FoodWindow" 408H.

A window ready module 924 is also present. This module ensures that the window associated with the user interface object to be made visible is in a state to accept user input, as detailed above. Briefly, this module checks that conditions are such that the user interface element can be selected are true. Examples of such conditions are: that the window is enabled, that the thread that the window belongs to is a foreground thread, or that there is not another object covering the user interface element to be made visible.

Alternative Embodiments

In another exemplary embodiment, expandable elements are expanded top down. Some elements such as those in a collapsed treeview are not visible by nature of the expansion—they are in a hidden part. To ensure an expandable target element is visible, the target hierarchy is expanded from the top to the bottom. That is, the target element is traversed to locate the top element in the hierarchy. Then, the top element is expanded. If this element itself has a child, it is expanded, and so on, until the target element is reached, and made visible. Controls such as cascading dialog boxes, cascading menus, combo list boxes, multiple-selection extended list boxes and so on may all require expansion.

In another embodiment, the expandable target is expanded bottom-up, that is, by expanding it, then expanding its parent, and so on up to the top element in the hierarchy.

In another embodiment, an element is made visible by a combination of expansion and scrolling: the hierarchy is traversed to the top element; as the tree is traversed back down, each element along the traversal route is either expanded or scrolled, depending on its type.

The implementations described here are technology agnostic, in that it should be able to be implemented for any given GUI with scrollable or expandable elements. Furthermore, the functionality is expected to be built into the automatic testing programs so that the implementation is invisible to users of the automatic testing programs; the objects appear visible and ready for input without further work required. A user should not need to know how the make visible mechanism works for a control of a particular type. For example, a user need not send an operating system message to make one sort of GUI element visible and drag a scrollbar thumb to make a different GUI element visible.

Functionalities that comprise the embodiments herein disclosed should be extensible; if a default action that performs actual scrolling and expanding does not work for a specific element then the action can be overwritten by a user, with all underlying procedures and verifications unchanged. For instance, to use a specific example, if Page Up/Page Down is the default action that scrolls container1 but it does not work for container2, but Ctrl-Wheel will scroll container2, then the user can redefine this portion of the functionality. However, the procedures should preferably remain unchanged that make basic decisions. Such procedures include the direction to scroll, when to stop, if scrolling was successful, and so on.

Other Alternatives

Having described and illustrated the principles of our invention, it will be recognized that the various embodiments can be modified in arrangement and detail without departing from such principles. It should be understood that the programs, processes, or methods described herein are not related or limited to any particular type of computing environment, unless indicated otherwise. For example, the technologies described herein may be applied to any user interface element that can be selected by a user.

Various types of general purpose or specialized computing environments may be used with or perform operations in accordance with the teachings described herein. Elements of embodiments shown in software may be implemented in hardware and vice versa. Various types of general-purpose or specialized computers may be used to perform the systems and methods disclosed herein. Furthermore, actions described herein can be achieved by computer-readable media comprising computer-executable instructions for performing such actions.

In view of the many possible embodiments to which the principles of our invention may be applied, it should be recognized that the detailed embodiments are illustrative only and should not be taken as limiting the scope of our invention.

Rather, I claim as my invention all such embodiments as may come within the scope and spirit of the following claims and equivalents thereto.

I claim:

1. A computer-implemented method comprising:
within an automated user interface test environment, a testing program that emulates keyboard and mouse data invoking a request for choosing a user interface element that is to be made visible;
the testing program determining at least one parent element of the user interface element;
the testing program performing a make child visible action for the at least one parent element of the user interface element; and
the testing program ensuring that the user interface element is selectable;
wherein the testing program performing a make child visible action comprises:
a) if the parent element is scrollable, then a scrolling component of the testing program scrolling the parent element in a move direction until a bounding rectangle of the parent element and a bounding rectangle of the user interface element overlap, wherein there are N child elements of the parent element, and wherein the scrolling the parent element comprises:
searching for a visible child element of the N child elements by recursively checking for visibility of each nth child element of the N child elements, initially n=N/2 or n=N/3, and at each successive recursion level n=n/2;
once the visible child element is found, finding a first visible child element of the N child elements using a binary search; and
determining, based on a location of the first visible child element and a location of the user interface element, the move direction for scrolling the parent element;
b) if the parent element is expandable, then an expanding component of the testing program expanding the parent element;
c) if the parent is not at top of the user interface element hierarchy, then a component of the testing program moving up one level of the hierarchy such that a grandparent of the user interface element is the new parent element and the parent element of the user interface element is the new user interface element.

2. The method of claim 1, wherein scrolling the parent element in the move direction reaches an end location prior to the user interface element becoming visible, and wherein the method further comprises the scrolling component of the testing program scrolling the parent element in the opposite direction to the move direction until the user interface element is visible.

3. The method of claim 1, wherein scrolling the parent element in the move direction fails to change the current location, and wherein the method further comprises the scrolling component of the testing program scrolling the parent element in the opposite direction to the move direction until the user interface element is visible.

4. The method of claim 1, wherein each child element that has been checked for visibility is marked, and wherein the marked child elements are not checked in subsequent recursive searching for the visible child element.

5. The method of claim 4, further comprising a hash table and wherein the marked child elements are stored in the hash table.

6. The method of claim 1, wherein the user interface element is selected from an element list comprising: a listbox, a combo box, a menu, a multi-column listbox, a multi-column combo box, a multiple selection extended listbox, a text box, a scroll pane, a tabbed pane, a calendar, a tree, or a window.

7. The method of claim 1, wherein the testing program ensuring the user interface element is selectable comprises the testing program ensuring that a window associated with the user interface element is ready for user input.

8. The method of claim 7, wherein the testing program ensuring that the window associated with the user interface element is ready for input comprises at least one of a component of the testing program setting a property to give a window associated with the user interface object focus, a component of the testing program setting a property to make a thread associated with the interface object a foreground thread, or a component of the testing program determining that ensuring there is not another object covering the user interface object.

9. The method of claim 7, wherein ensuring that the window associated with the user interface object is ready for input comprises a component of the testing program determining that an invisible element is in front of the user element and, in response, the component of the testing program relocating the invisible element to a location which allows the user element to be selected.

10. A computer-readable medium storing computer-executable instructions for causing a computer system to perform the method of claim 1.

11. The method of claim 1 wherein the testing program performing a make child visible action further comprises: d) if the parent is at the top of the user interface element hierarchy, then scrolling each parent element in the hierarchy of elements.

12. The method of claim 1 wherein the testing program determining at least one parent element of the user interface element comprises the testing program traversing a hierarchy associated with the user interface element until top object of the hierarchy is reached.

13. In a computer system having a user interface, the system comprising:
   computer memory;
   a processing unit; and
   an automated testing service stored in the computer memory and executable using the processing unit, comprising:
      a test program that emulates keyboard and mouse data;
      a request action module, which requests that a user interface object be made visible, wherein the user interface object is one of a plurality of user interface objects, and wherein the plurality of user interface objects comprise a plurality of hierarchically-arranged nodes;
      an automated tester module, which triggers the request action for the user interface object to be made visible for use by the test program;
      a traverse hierarchy module, which when triggered by the automated tester module, traverses a hierarchy of objects to locate the user interface object;
      an expand module, which, when a parent object of the user interface object is expandable, expands the parent object to make the user interface object visible;
      a locate in parent module, which, when triggered by the traverse hierarchy module, searches elements of the parent object to locate a current child object within the parent object to make the current child object visible;
      a locate in grandparent module, which, when triggered by the locate in parent module, and when the parent object is scrollable, scrolls the parent object in a move direction to make the current child object visible in a separate grandparent object, wherein the parent object has N child objects, and wherein the scrolling the parent object comprises:
         searching for a visible child object of the N child objects by recursively checking for visibility of each nth child object of the N child objects, initially n=N/2 or n =N/3, and at each successive recursion level n =n/2;
         once the visible child object is found, finding a first visible child object of the N child objects using a binary search; and
         determining, based on a location of the first visible child object and a location of the current child object, the move direction for scrolling the parent object; and
      a window ready module, which ensures that a window associated with the user interface object is ready to accept user input.

14. A computer system comprising:
computer memory;
a central processing unit; and
a user-interface service stored in computer memory and executable using the central processing unit, comprising:
means for an automated test program to trigger a request action to designate a user object element as to be made visible, the user object element a component of a user object, the user object being part of a hierarchically-arranged set of user objects, and the child object of a parent object;
means for the automated test program to hierarchically traverse the hierarchically-arranged set of user objects to determine the parent object;
means for the automated test program to scroll the parent object in a move direction to display the user object element, wherein the parent object has N child objects, and wherein the scrolling the parent object comprises:
   searching for a visible child object of the N child objects by recursively checking for visibility of each nth child object of the N child objects, initially n=N/2 or n=N/3, and at each successive recursion level n=n/2;
   once the visible child object is found, finding a first visible child object of the N child objects using a binary search; and
   determining, based on a location of the first visible child object and a location of the user object element, the move direction for scrolling the parent object;
means for the automated test program to scroll the parent object to display the user object element in a separate grandparent object;
means for the automated test program to expand the user object to display the user object element;
means for the automated test program to search an element list of the user object to locate the user object element;
means the automated test program to set a property which designates that a window associated with the user object element has focus; and
means for the automated test program to select the user object element.

* * * * *